April 10, 1962  C. P. HUDNALL, JR  3,028,922
FACE DRILL
Filed March 20, 1959  4 Sheets-Sheet 1

INVENTOR
Charles P. Hudnall, Jr.
BY Rommel, Allwein and Rommel
ATTORNEYS

April 10, 1962   C. P. HUDNALL, JR   3,028,922
FACE DRILL
Filed March 20, 1959   4 Sheets-Sheet 2

INVENTOR
Charles P. Hudnall, Jr.
BY Rommel, Allwine & Rommel
ATTORNEYS

April 10, 1962 C. P. HUDNALL, JR 3,028,922
FACE DRILL
Filed March 20, 1959 4 Sheets-Sheet 3
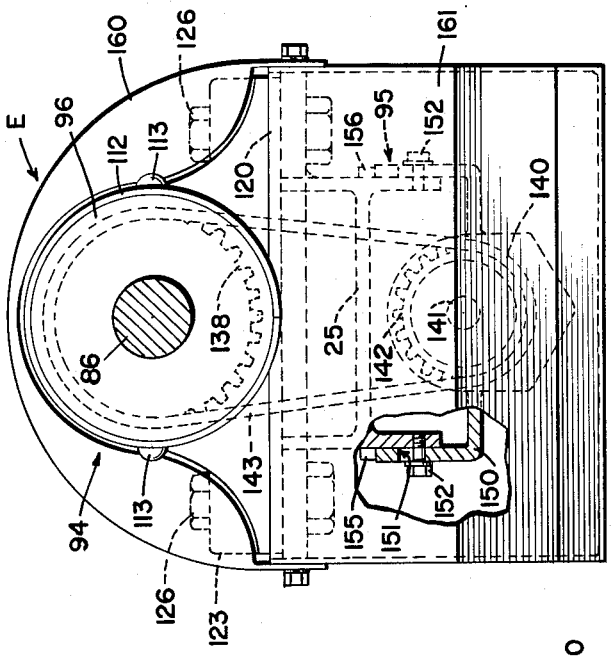
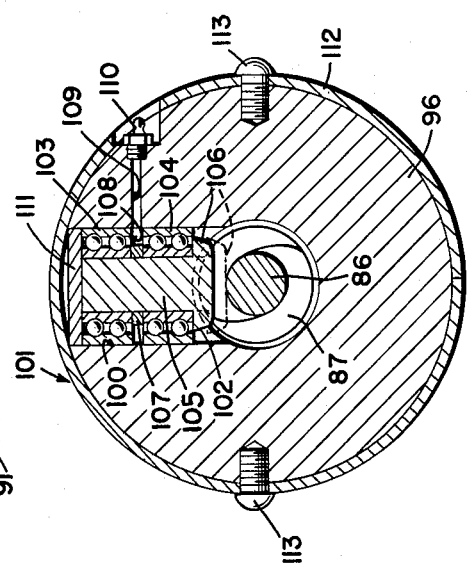
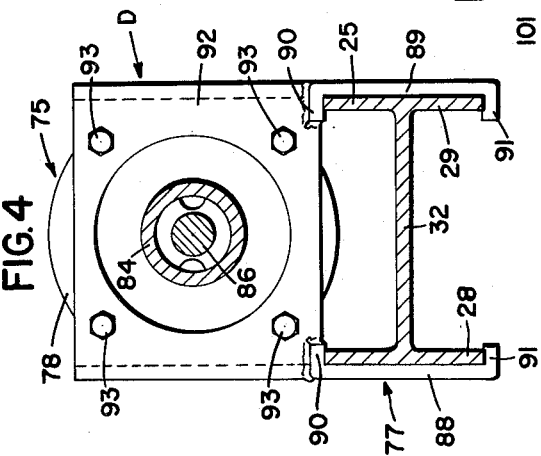
INVENTOR
Charles P. Hudnall, Jr.
BY *Rommel, Alluxius & Rommel*
ATTORNEYS INVENTOR
Charles P. Hudnall, Jr.

United States Patent Office 3,028,922
Patented Apr. 10, 1962

3,028,922
FACE DRILL
Charles P. Hudnall, Jr., Oak Hill, W. Va., assignor, by mesne assignments, to Marmon-Herrington Company, Inc., Indianapolis, Ind., a corporation of Indiana
Filed Mar. 20, 1959, Ser. No. 800,804
11 Claims. (Cl. 175—117)

This invention relates to improvements in face drills.

In certain drilling operations, such as drilling in seams of coal, it has long been a problem to provide a face drill that would penetrate extremely hard materials, such as the hard bone and sulphur balls that are present in some seams of coal. The usual drilling operation is completed by a single operator, utilizing a hand-held drill, and it is virtually impossible for the operator to exert sufficient pressure upon the drill to accomplish a satisfactory job of drilling through the hard material encountered. It is the primary object of my invention to provide a face drill having drill feeding means wherein the drill motor provides the motive power to advance the drill auger into the working face.

It is a further object of my invention to provide a mobile carrier for my face drill and drill feeding means whereby the face drill can be manipulated into any position that could normally be reached by a hand held drill and the mobile carrier, face drill auger and drill feeding means cooperate to provide the thrust for advancing the face drill auger into the working face.

A further object of my invention is the provision of a cam follower that is mounted to rotate with and ride within the scroll of the face drill auger, which follower is provided with independent brake means, so that as the drill auger is normally rotated the cam follower will ride upon the auger intermediate the scrolls, and as a braking force is applied to the rotation of the cam follower the follower will exert a pressure against the edge of the scroll, feeding the drill forward or in reverse, dependent upon the direction of rotation of the drill.

Other objects and advantages of my invention will be apparent during the course of the following detailed description of the invention, taken in connection with the accompanying drawings, forming a part of this specification, and in which drawings:

FIG. 4 is an enlarged vertical sectional view taken substantially on the line 4—4 of FIG. 2.

FIG. 5 is an enlarged end view of my improved face drill, with parts thereof broken away to disclose the preferred details.

FIG. 6 is an enlarged horizontal sectional view taken substantially on the line 6—6 of FIG. 2.

FIG. 7 is an enlarged vertical sectional view taken substantially on the line 7—7 of FIG. 2.

FIG. 8 is a vertical sectional view taken substantially on the line 8—8 of FIG. 6, but showing a modified form of brake means.

Figure 1:
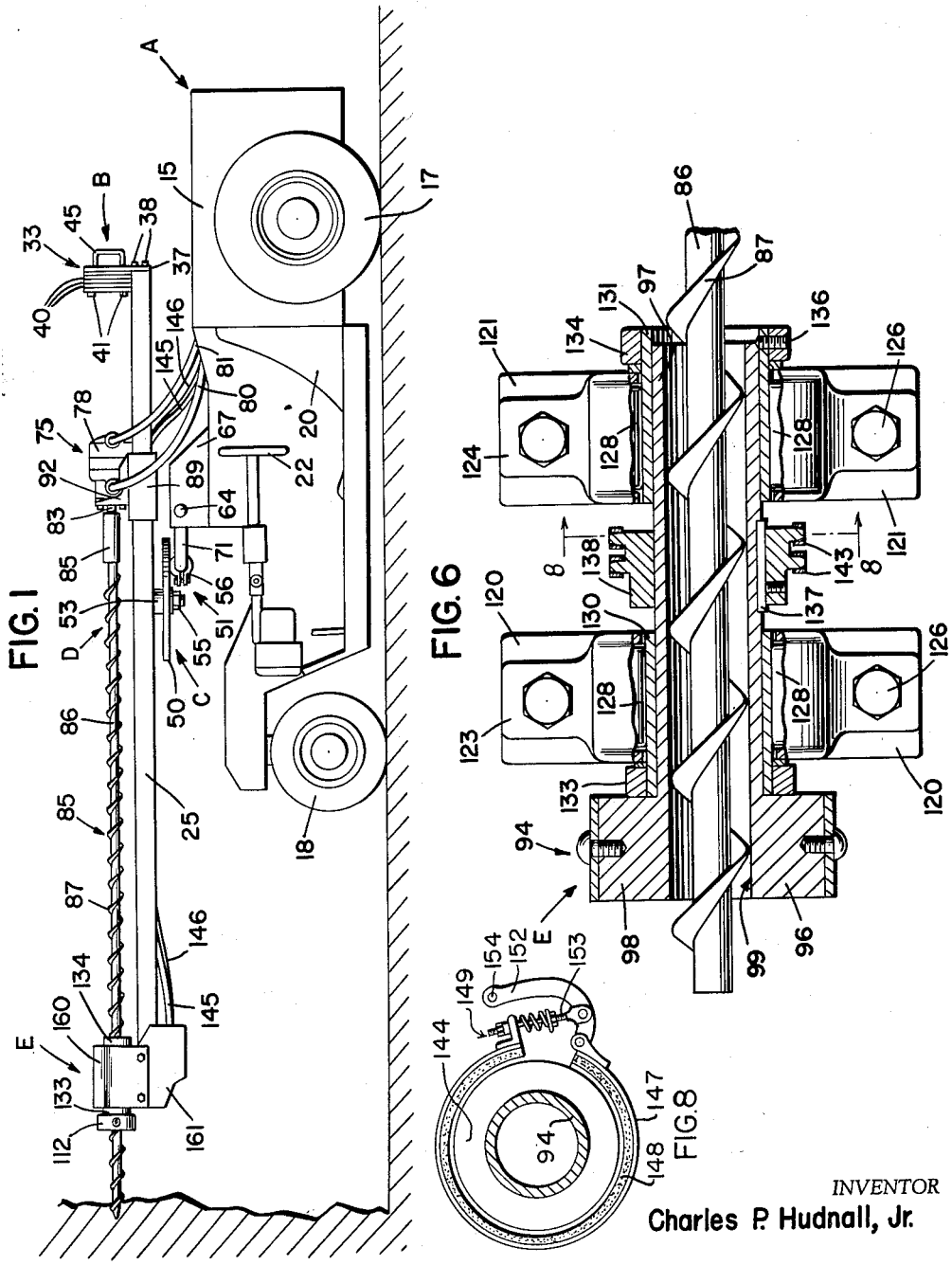
FIG. 1 is a side elevation of my improved face drill, showing the drill mounted upon the mobile carrier and positioned for a drilling operation.
Figure 2:
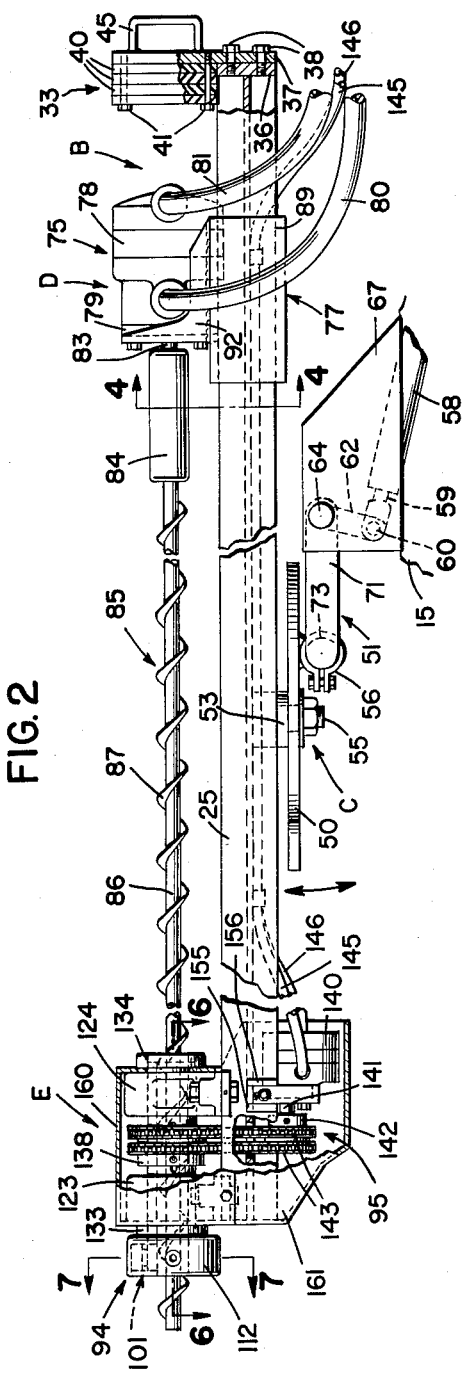
FIG. 2 is an enlarged side plan view of my improved face drill, with parts thereof broken away to disclose the preferred details.
Figure 3:
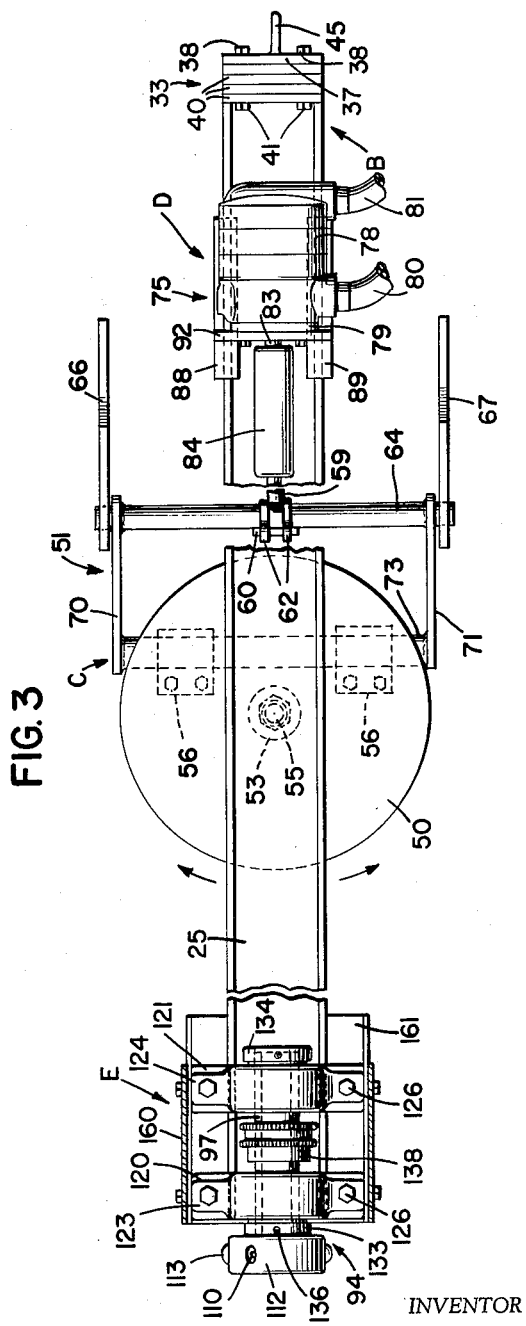
FIG. 3 is an enlarged top plan view of my improved face drill, with parts thereof broken away to show the preferred details.
Figure 9:
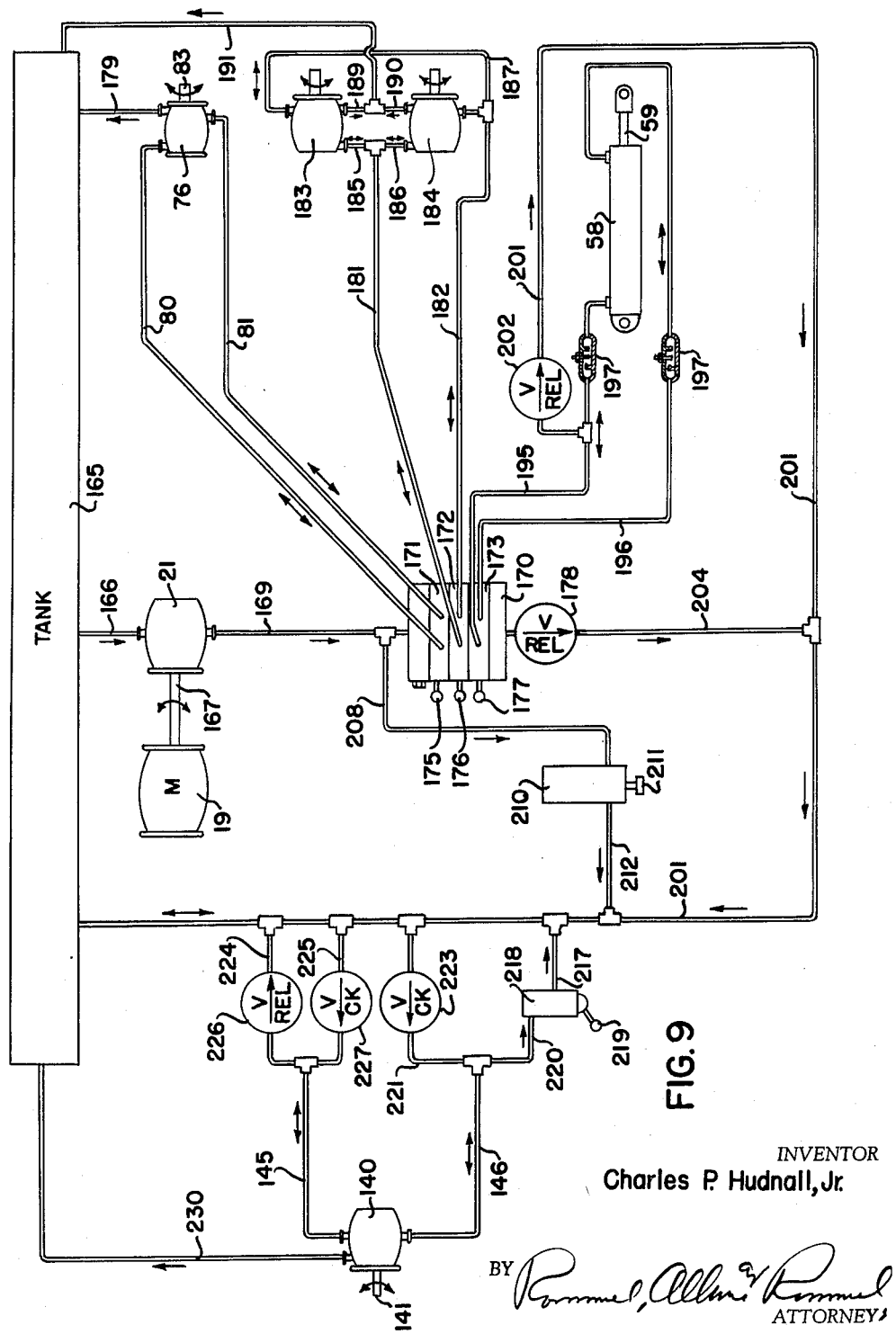
FIG. 9 is a diagrammatic view of the hydraulic system of the face drill.

In the drawings, wherein for the purpose of illustration is shown a preferred form of the invention, and wherein similar reference characters designate corresponding parts throughout the several views, the letter A may generally designate a mobile carrier; B the drill frame; C a carriage for support of the frame B upon the mobile carrier A so that the frame B may be relatively positioned for the desired drilling operation; D a drill unit supported upon the frame B; and E the drill feeding means mounted upon the frame B in operative relationship with respect to the drill unit D.

The mobile carrier A is preferably a self-tramming vehicle carrying a power source for the supply of hydraulic fluid under pressure for activating the drill unit D. In the drawing, the mobile carrier A is shown as comprising a main body portion 15 mounted upon rear wheels 17 and front wheels 18, the rear wheels 17 being the drive wheels and the front wheels 18 being pivotally mounted upon the body portion 15 for steering of the mobile carrier A. A seat 20 for the driver may be provided and a steering wheel 22 may be conveniently positioned with respect to the seat 20 for the turning of the front wheels 18. The mobile carrier shown is specifically designed for use in low ceiling coal mines and the body portion 15 preferably carries an electric power source 19 for driving a hydraulic pump 21 that supplies the necessary hydraulic pressure to the drill unit D. Conventional control valves for the selective supplying of hydraulic fluid to the drill unit D may be mounted upon the mobile carrier A, as will be subsequently described.

The drill frame B preferably comprises an elongated track 25 that is preferably of the I beam or H beam type, having a pair of longitudinally extending vertical side members 28 and 29, and a longitudinally extending horizontal web portion 32 interconnecting the vertical side members 28 and 29.

Mounted at one end of the track 25 is a bumper 33 for absorbing the impact of the drill unit D when the same is retracted from the working face. This bumper 33 preferably comprises a supporting plate 36 that is welded or otherwise secured to the track 25, extending between the vertical side members 28 and 29; a rear mounting plate 37 that is secured to the supporting plate 36 by means of the bolts 38 and extends above the uppermost surface of the track 25, to a height substantially the same as the drill unit D; and a plurality of resilient pads 40 mounted upon the front surface of plate 37 and secured thereto by means of the bolts 41. In the retraction of the drill auger from the drilling face, the same is usually retracted at a considerably high rate of speed, the drill unit D moving rearwardly along the track 25 at a corresponding rate of speed, and the inertia of the drill unit D carries it into abutment with the resilient pads 40, which pads absorb the impact of the rearward motion.

A handle member 45 may be secured to the rear surface of the rear supporting plate 37, opposite the resilient pads 40, for guiding the drill into the working face.

The varriage C preferably comprises a pivot plate 50 that supports drill frame B, and linkage means 51 for raising and lowering the pivot plate 50. In the attachment of the pivot plate 50 to the frame B, a bearing member 53 is secured to the under-surface of the web 32 of the track 25 and the pivot plate 50 secured to the bearing member 53 by the bolt means 55. The under-surface of the pivot plate 50 is provided with brackets 56 for attachment of the linkage means 51 thereto.

The linkage means 51, for raising and lowering the drill frame B, preferably includes a hydraulic cylinder 58 having a reciprocable piston 59 that is pivotally secured, as by the pivot bar 60, to a pair of upwardly extending arms 62. The arms 62 are welded or otherwise secured to a shaft 64 that is pivotally mounted intermediate the side plates 66 and 67 of the mobile carrier A. A pair of arms 70 and 71 are welded, or otherwise secured, at one end thereof, to the shaft 64, and a pivot shaft 73 is secured intermediate the arms 70 and 71, at the opposite ends thereof from the shaft 64. The shaft 73 is pivotally mounted within the brackets 56 of the pivot plate 50.

By this construction it will be seen that when hydraulic fluid pressure is applied to the cylinder 58, in the appropriate end of the cylinder, from the hydraulic fluid pressure source of the carrier A, the piston 59 will be moved either downwardly or upwardly by the piston 58, which movement will be translated through the arms 62, to the shaft 64, and thence to the arms 70 and 71, for raising or lowering the entire drill frame B. The pivotal mounting of the carriage plate 50 upon the shaft 73 permits vertical angular movement of the drill frame B, and the pivotal mounting of the pivot plate 50 within the bearing member 53 of the frame B permits horizontal angular movement of the drill frame B.

The drill unit D preferably comprises a drill motor 75 and a supporting base 77 for the mounting of the drill motor structure 75 upon the track 25.

The drill motor structure 75 includes a conventional hydraulic motor 76 and a main body portion 78 with a front plate 79 secured to the main body portion 78. A pair of inlet and outlet conduits 80 and 81 are secured to the main body portion 78 for the inflow and outflow of hydraulic fluid. The flow of hydraulic fluid will be reversible, as is well known, so that the hydraulic motor 75 can be rotated in either a clockwise or a counterclockwise direction. The hydraulic motor is provided with a shaft 83 upon which is mounted an auger socket 84 that receives the auger 85. The auger 85 is a conventional screw-type auger having an elongated central shaft 86 provided with a spiral scroll 87 about substantially the entire length thereof. In the type drill shown in the drawings the auger is approximately nine feet long and the scroll has a pitch of approximately two inches.

The supporting base 77 for the drill motor 75 comprises a pair of side plates 88 and 89 that are the same height as the side members 28 and 29 of the track 25 and are each provided with an inwardly turned upper flange 90 and an inwardly turned lower flange 91, each side plate 88 and 89 being slidably socketed upon one of side members 28 and 29 with the side members 28 and 29 fitting intermediate the upper and lower flange thereof as shown in FIG. 4. An upwardly extending cradle bracket 92 is secured to the upper flanges 90 of each of side plates 88 and 89, holding these side plates in position upon the side members 28 and 29, and the drill motor 75 is secured to the cradle bracket 92 by bolt means 93. A suitable opening is provided through the cradle bracket 92 for the drill motor shaft 83.

The drill motor 75 is thus securely supported upon the base 77 and the base 77 is slidably supported upon the track 25 so that the drill unit B can be moved, in either direction, longitudinally along the track 25.

The drill feeding means E preferably comprises an auger feeding tube 94 which receives the auger of the drill unit D and which is rotatably mounted upon the drill frame B, and brake means 95 for retarding the rotation of the auger feeding tube.

The auger feeding tube 94 preferably includes a main body portion 96 comprising an elongated cylindrical tube portion 97 having at one end thereof an enlarged end portion 98, the cylindrical tube portion 97 and the enlarged head section 98 defining a cylindrical chamber 99 axially thereof for receiving the auger 85. An opening 100 is provided radially of the end portion 98 for receiving cam means 101 that cooperatively engages with the auger 85. The cam means 101 preferably includes a cam follower 102 that is supported within the opening 100 by a pair of bearings 103 and 104.

The cam follower 102 preferably includes an elongated shaft 105 having an enlarged head portion 106 at one end thereof, for a purpose to be subsequently described.

The bearings 103 and 104 are of conventional construction and are press fitted within the chamber 100 and supported in a spaced relation by the washer 107. This washer 107 is of less diameter than the bearings 103 and 104 and provides a space 108 between these bearings for the reception of a lubricant. A channel 109, leading from the space 108, is provided outwardly through the end portion 98 and receives a grease fitting 110 for the insertion of a lubricant into the opening 108.

The cam follower 102 is loosely supported by the bearings with the shaft 105 interfitting within the bearings 103 and 104 and the head portion 106 extending therebelow and into the chamber 99 of the auger feeding tube. The cam follower 102 is slidably supported by the bearings 103 and 104 so that it can move either upwardly or downwardly and ride along the shaft 86 of auger 85. In FIG. 7 the cam follower 102 is shown in the position that it would assume while the auger is actually rotating and is shown in dot and dash lines in the position that it will assume when the auger is at rest. It will be seen that when the auger is at rest that the cam follower 102 will rest upon the shaft 86 of the auger 85, but that when the auger is rotated the cam follower 102 will ride upwardly along the scroll 87 into abutment with the lowermost portion of the bearing 104. By this construction both the bearings and/or the cam follower can be easily replaced if they become worn.

A cover 111 may be placed over the opening 100 and a ring 112 then secured over the cover plate 111 and about the outer periphery of the end portion 98 for securing the bearings in place against the upward push of cam follower 102. The ring 112 may be either a split ring, as shown in the drawings, or may be a solid ring that is slipped over one end of the end portion 98. This ring 112 may be secured in place by means of the screws 113.

In the mounting of the auger feeding tube 94 for rotatable movement upon the drill frame B, a pair of plates 120 and 121 are welded or otherwise secured to the uppermost surface of the track 25 and a pair of pillow blocks 123 and 124 are removably secured to the plates 120 and 121, respectively, as by the bolts 126. The pillow blocks 123 and 124 each support roller bearings 128 that define a cylindrical opening for supporting the auger feeding tube 94.

The size of auger feeding tube 94 will vary according to the size of the auger and, as it is desirable to avoid changing of the pillow blocks for each size of auger feeding tube, I have provided bushing sleeve members 130 and 131 that may be removably secured to the auger feeding tube 94 by rings 133 and 134, the set screw 136 securing the rings and bushing sleeve members in place. In actual practice the pillow blocks 123 and 124 will support roller bearings 128 defining a cylindrical opening for receiving the largest size auger feeding tube that it is anticipated will be used and, as shown in the drawings, when a smaller auger feeding tube is used, the proper size bushing sleeve members 130 and 131 will be secured to the outer periphery of the auger feeding tube, providing a peripheral outer surface of a size to be properly received within the roller bearings 128.

Secured about the auger feeding tube 94 and keyed thereto, as by the key 137, is a sprocket 138. This sprocket 138 cooperates with the brake means 95 as will be subsequently described.

The brake means 95 may be any apparatus that will interact with the auger feeding tube 94 and slow down the rotation thereof with respect to the auger 85. In the drawings I have shown the brake means 95 as including a hydraulic pump 140 having a shaft 141, with a sprocket 142 mounted upon the shaft 141. A double drive chain 143 is entrained about the sprockets 142 and 138, so that the rotating auger feeding tube 94 drives the hydraulic pump 140. A gear train or V-belt drive may, of course, be substituted for the drive chain. The pump 140 will normally be driven by the auger feeding tube at the same rate of rotation as the auger feeding tube and in the same direction of rotation as the auger feeding tube. The hydraulic fluid then flows freely through the feeding lines 145 and 146 in a direction according to the direction of rotation of the pump. When it is desired to brake the rotation of the auger feeding a flow control valve or other restrictive valve is actuated to slow the feeding of hydraulic fluid from the pump, as will be subsequently described. This exerts a load upon the pump and causes the pump to work and in turn slow down in its rotation which will, in turn, slow down the rotation of the auger feeding tube 94.

It is to be understood that any conventional form of brake may be substituted in lieu of the hydraulic braking means shown in the drawing, for instance, as shown in FIG. 8, a conventional external contracting automotive brake drum 144 may be secured to the auger feeding tube 94, with a brake band 147 and brake lining 148 operatively positioned thereabout. Brake band lever controls 149 are secured to the brake band for contracting the band about the drum, the controls including a brake band lever 152 pivotally mounted on the brake band 147 and a spring tensioned linkage 153 for returning the band to its expanded position after contraction. Any conventional form of linkage controls may be secured to the brake band lever 152, as at 154, for operating the brake. In this form the controls for the brake shoes could be fed beneath the track 25, in approximately the same position as are shown in the hydraulic fluid feeding tubes so that they will be handy to the operator. Many other forms of either frictional or fluid activated braking means may be substituted in lieu of those shown in the drawings.

In the mounting of the hydraulic pump 140 upon the track 25, I have provided a mounting bracket 150 secured to the hydraulic pump 140, the ends of the bracket 150 being provided with slots 151 and screw threaded bolts 152 inserted through the slots 151 and secured to the depending arms 28 and 29 of the track 25. This permits the hydraulic pump to be moved upwardly or downwardly with respect to the track 25 so that the tension upon the drive chains 143 may be adjusted. A pair of guide lugs 155 and 156 are secured to the tracks 25, to either side of the bracket 150, so that any movement of the motor with respect to the track will be in a straight line, preventing any misalignment of the sprockets 138 and 142, which might result in a faulty training of the drive chains 143 thereabout.

If desired, a protective cover 160 may be provided about the auger feeding tube 94, covering the sprocket 138, and a protective cover 161 may be provided about the brake means 95, covering the sprocket 142, so that these parts are substantially protected from dirt and dust that may be thrown back from the drilling operation and the possibility of any bodily injury to the operators by these moving parts is considerably reduced.

The power supply for the various elements of the drill preferably include a hydraulic fluid supply tank 165 mounted on the carrier A, with a fluid supply line 166 leading from the tank 165 to the hydraulic pump 21. The hydraulic pump 21 is preferably connected to and driven by the electric motor 19, through the coupling shaft 167, the pump 21 preferably being a vane type hydraulic pump capable of pumping 12.5 gallons per minute, operating at a speed of 1750 revolutions per minute and delivering hydraulic fluid at a pressure of 2000 p.s.i. Hydraulic fluid is pumped from the pump 21 through the supply line 169 to a valve bank 170. The valve bank 170 is provided with a plurality of independently operable valve sections 171, 172 and 173, controlled by the levers 175, 176 and 177, respectively. Relief valve 178 is, in reality, contained within the valve bank 170, being diagrammatically shown exteriorly thereof for purposes of clarity. This relief valve is set at 1750–2000 p.s.i. and provided so that in the event the other portions of the system are closed, fluid pumped by the pump 21 will be able to flow back to the tank 165. As a matter of fact, each of the sections 171, 172 and 173 are provided with overriding relief valves to prevent overloads, each being set at 1500 p.s.i.

Fluid supply lines 80 and 81 lead from the valve bank section 171 to the drill motor 76. The drill motor 76 is being preferably a vane type, 2000 p.s.i., reversible hydraulic motor that is externally drained into the supply tank 165 through the line 179.

Hydraulic fluid supply lines 181 and 182 lead from the valve bank section 172 to the tram motors 183 and 184 respectively. Tram motors 183 and 184 are preferably gear type, 2000 p.s.i., reversible hydraulic fluid motors, the tram motors 182 and 184 being interconnected for synchronized operation by means of the lines 185, 186 and 187, and being externally drained through the supply lines 189, 190 and 191.

Hydraulic fluid supply lines 195 and 196 lead from the valve bank section 173 to the hydraulic lift cylinder 58. Each of the supply lines 195 and 196 is provided with a flow regulator 197, each of which flow regulators is manually set for permitting flow of a predetermined supply of hydraulic fluid to and from the lift cylinder 58. A by-pass line 201 is "teed" into supply line 195, intermediate the valve bank section 173 and the flow regulator 197, and a relief valve 202 provided in the line 201 for protecting the cylinder when the operating valve is in neutral. This relief valve is set at 700 p.s.i., and the line 201 acts as an external drain, returning the fluid to the tank.

The valve bank 170 is externally drained through the line 204, which is interconnected with the line 201, for returning excessive hydraulic fluid to the tank.

Interconnected with the supply line 169, intermediate the pump 21 and the valve bank 170, is a supply line 208 leading to a foot throttle 210. The foot throttle 210 comprises a normally opened valve which will, upon depression of the lever 211, partially close, so that when no pressure is exerted upon the lever 211, all of the fluid being pumped by the pump 21 will be diverted from the supply line 169, through the foot throttle 210, through line 212, and be returned to the hydraulic tank 165 through line 201.

A plurality of lines are interconnected to line 201, intermediate the connection thereto of line 212 and the tank 165, for operation of the drill feed pump 140. The line 217 leads from line 201 to a flow regulator 218, which flow regulator is normally opened, and may be manually operated by the lever 219, to restrict the flow of fluid therethrough. A line 220 interconnects the inlet port of the flow regulator 218 with the supply line 146, leading to the pump 140. Also interconnected with line 201, and leading into the line 146 is a line 221 provided with a check valve 223. Lines 224 and 225, the line 224 having a relief valve 226, set at 500 p.s.i. and the line 225 having a check valve 227, are connected to the line 201 and are interconnected to the supply line 145, leading to the pump 140. The drill feed pump 140 is preferably a gear type, 2000 p.s.i. reversible hydraulic pump and may be externally drained through the line 230 to the hydraulic fluid tank 165.

In the operation of the apparatus, the electric motor 19 is activated, rotating the shaft 167 and causing the pump 21 to operate, withdrawing hydraulic fluid from the tank 165 through the supply line 166 and discharging the hydraulic fluid, under pressure, through the line 169. At this time, none of the various elements are in operation, and the foot throttle 210 will be opened, so that all of the hydraulic fluid pumped through the line 169 will flow through the line 208, through the throttle 210, through the line 212, into the line 201, and back into the tank.

The drill is now tramed forward into position adjacent the surface that is to be drilled by raising the lever 176 of the valve bank section 172 to feed the hydraulic fluid through the line 181, and the foot throttle 210 is slightly depressed, causing restriction in the flow of fluid returning to the tank. The amount of depression of the foot throttle determines the fluid volume delivery into the valve bank 170, thereby regulating the fluid volume flowing through the valve bank section 172 for delivery to the tram motors 183 and 184. The greater the fluid volume diverted to the tram motors, the greater the speed of these motors. When the tram motors are to be reversed, the lever 176 will be moved down, so that the hydraulic fluid is supplied to the tram motors through the supply line 182.

The hydraulic lift is then positioned by activating the cylinder 58. This is accomplished by moving the lever 177 into proper position for delivery of hydraulic fluid through either the supply lines 195 or 196, depending on whether the hydraulic lift is to be raised or lowered, and the foot throttle 210 is depressed, to govern the supply of fluid to the hydraulic cylinder 58. The flow control regulators 197 have been previously set for a predetermined rate of flow of the hydraulic fluid to and from the cylinder 58. The relief valve 209 is provided in order to protect the cylinder when the operating valve is in neutral, so that excessive pressure will not be applied to the hydraulic lift cylinder. Such excessive pressure might be accidentally supplied by an external force acting on the track, such as would occur if the track hit the roof.

The drill motor is then activated by moving lever 175 up into position for feeding of the hydraulic fluid through the line 80 for clockwise drilling rotation of the auger, and the foot throttle at 210 is depressed the desired amount for the desired speed of rotation of the auger. At this time, the auger feeding tube 94, the shaft 141 of the pump 140 and the auger 85 will be rotating in a clockwise direction at the same rate of speed, with the flow regulator 218 fully opened and fluid circulating from line 201, through check valve 227, through line 145, through pump 140, through line 146, and back to line 201 through the flow regulator 218.

The auger is now advanced by turning lever 219 of the flow control valve 218, thereby partially closing the flow control valve, so that the feed pump 140 is caused to work, exerting a back pressure on the pump that slows rotation of the pump which will, in turn, slow rotation of the shaft 141, causing a slowing down of the rotation of the auger feeding tube 94, so that the auger feeding tube 94, shaft 141 of the pump 140 and the auger 85 are no longer rotating at the same rate of speed. This slowed rotation of the shaft 141 is then transmitted through the sprocket 142, to the chains 143, and to the sprocket 138, mounted upon the auger feeding tube 94, causing the auger feeding tube 94 to rotate at the same rate of rotation as the pump, which is slower than the speed of rotation of the auger 85. This crowds the cam follower 102 into abutment with the face of the scroll 87 and, as the cam follower is longitudinally fixed and cannot escape from between the spirals of the scroll 87, the cam follower will follow the spirals of the rotating scroll 87 and will feed the auger 85 forward into the face. When such feeding occurs, the hydraulic motor 75 and auger 85 can be moved along the track 25 until a hole of the desired depth is drilled.

When it is now desired to withdraw the auger from the face, the lever 175 is moved down for feeding of fluid through the line 81, which reverses rotation of the drill motor 75 and thereby reverses rotation of the auger, which in turn reverses rotation of the auger feed tube 94. Reversal of the auger feed tube likewise reverses the drill feed pump 140 and fluid then flows to pump 140 from line 201, through check valve 223, through the line 146, through the line 145, through the relief valve 226, and back to the line 201. Inasmuch as it is not necessary to vary the rate of withdrawal of the auger, but the same may remain constant, the relief valve 226 usually set at 500 p.s.i. will apply a constant back pressure in the line 145, exerting a constant working effort upon the pump 149, so that the rate of rotation of the pump is slowed down, thereby causing a slow down in the rotation of the auger feeding tube, causing the cam follower to abut the rear face of the scroll 87, and the auger 85 is withdrawn from the work by inneraction of the cam follower 102 and the scroll 87. In the withdrawal of the auger from the face, the hydraulic motor 75 and auger 85 will ride upon the track 25 in the rearward direction and, in the event that the auger is withdrawn too rapidly, the rearward motion of the hydraulic motor and auger 85 will be cushioned by the bumper 33.

Use of the foot throttle 210 has been stressed in each step as a safety feature in that the operator must be in position on the machine to go through the various maneuvers in completing a drilling cycle. It is obvious that the use of the foot throttle alone does not regulate flow of fluid, and such is further regulated by the degree of movement of the levers 175, 176, and 177.

While the drawings, FIG. 1 in particular, show the drill being operated to the front of the mobile carrier A, and as such would have a limited degree of upward vertical angular movement due to interference with the main body portion 15 of the mobile carrier A, it is to be understood that the drill frame B may be pivoted with respect to the mobile carrier, about the pivotal axis provided by the bolt means 55 and bearing member 53, for drilling into a face to either side or the rear of the mobile carrier A, as the particular drilling operation may require.

Various changes in the shape, size and arrangement of parts may be made to the form of the invention herein shown and described without departing from the spirit of the invention or the scope of the following claims.

I claim:

1. In a face drill for boring in a working face, the combination of a frame including a longitudinally extending track; an auger, said auger having a spiral scroll along the length thereof; a drill motor movably mounted upon said track, intermediate the ends thereof, and rotatably supporting said auger; cam means rotatably supported adjacent one end of said track, said cam means normally rotating with said auger, said auger extending longitudinally of said track from said drill motor and into cooperative abutment with said cam means and outwardly of the end of said track upon which said cam means is mounted; brake means mounted upon said frame and operatively connected to said cam means for retarding the rotation of said cam means, the retarding of rotation of said cam means bringing said cam means into cooperative abutment with said scroll, the abutment of said cam means and said scroll longitudinally moving said scroll with respect to said cam means and moving and retracting said auger into and out of the working face; and a bumper mounted at the opposite end of said track means from said cam means, said bumper forming an abutment limiting the movement of said drill motor away from said cam means and against which said drill motor can impinge.

2. The combination as specified in claim 1 wherein said bumper comprises a plurality of resilient pads that are secured to the end of said track opposite said cam means, said resilient pads extending above the uppermost surface of said track, in axial alignment with said drill motor.

3. In a face drill for boring in a working face, the combination of a frame, said frame including a longitudinally extending track of substantially an H-shaped cross section; an auger, said auger having a spiral scroll along the length thereof; a drill motor rotatably supporting said auger; a supporting base slidably mounted upon said track, intermediate the ends thereof, for supporting said drill motor movably upon said track, said supporting base including a pair of side plates that are slidably socketed on the side members of said track; a cradle bracket secured to the uppermost side edges of said side plates, said cradle bracket extending transversely of said track and securing said side plates in a slidably socketed position upon said track, said drill motor being fixedly secured in said cradle bracket; cam means rotatably supported upon said frame and in rotative cooperative abutment with said spiral scroll, said cam means normally rotating with said auger; and brake means mounted upon said frame and operatively connected to said cam means for retarding the rotation of said cam means, the retarding of rotation of said cam means bringing said cam means into cooperative abutment with said scroll, the cooperative abutment of said cam means and said scroll longitudinally moving said scroll with respect to said cam means and moving and retracting said auger into and out of the working face.

4. In a face drill for boring in a working face, the combination of a frame, said frame including a longitudinally extending track; an auger, said auger having a spiral scroll along the length thereof; a carriage slidably mounted upon said track; a drill motor mounted upon said carriage in juxtaposition for rotatably supporting said auger, said carriage holding said drill motor against rotational torque of said auger; cam means rotatably supported upon said frame and positioned for rotative cooperative abutment with said spiral scroll, said cam means normally rotating with and at the same speed as said auger; and operator controlled brake means mounted upon said frame and cooperatively connected to said cam means for selectively and variably retarding the rotation of said cam means during the drilling operation, the retarding of rotation of said cam means bringing said cam means into cooperative abutment with said scroll, the cooperative abutment of said cam means and said scroll longitudinally moving said auger with respect to said cam means and moving and retracting said auger into and out of the working face.

5. In a face drill for boring in a working face, the combination of a frame; an auger, said auger having a spiral scroll along the length thereof; a drill motor movably mounted on said frame and rotatably supporting said auger; cam means rotatably supported upon said frame and positioned for rotative cooperative abutment with said spiral scroll, said cam means normally rotating with said auger; and brake means mounted upon said frame, said brake means including a pump operatively connected to said cam means, the rotation of said cam means driving said pump, and means operably connected to said pump for placing a load thereupon, the loading of said pump acting to retard the rotation of said cam means and thus bring said cam means into cooperative abutment with said scroll, the cooperative abutment of said cam means and said scroll longitudinally moving said scroll with respect to said cam means for moving and retracting said auger into and out of the working face.

6. The combination as specified in claim 5 wherein said pump is mounted in a hydraulic system and said means operably connected to said pump for placing a load thereupon comprises a flow valve in said hydraulic system for restricting the flow of hydraulic fluid from said pump.

7. The combination as specified in claim 5 wherein a mobile carrier is provided for said frame including mounting means for the attachment of said frame to said mobile carrier, said mounting means including means for the adjustable positioning of said auger with respect to the working face, and a prime mover mounted upon said mobile carrier operatively interconnected to said drill motor and said pump for supplying actuating power to said drill motor and said pump.

8. The combination as specified in claim 7 wherein said mounting means includes a pivot plate attached to said drill frame for horizontal angular movement of said drill frame with respect to the working face, a hinge bracket secured to said pivot plate for vertical angular movement of said drill frame with respect to the working face, and linkage means supporting said drill frame upon said mobile carrier, said linkage means including lift means for horizontal elevation of the drill frame with respect to the mobile carrier.

9. In a face drill for boring in a working face, the combination of a frame; an auger, said auger having a spiral scroll along the length thereof; a drill motor movably mounted on said frame and rotatably supporting said auger; cam means rotatably supported upon said frame and positioned for rotative cooperative abutment with said spiral scroll, said cam means normally rotating with said auger; and brake means mounted upon said frame, said brake means including a hydraulic pump, coupling means for interconnection of said pump and said cam means for complementary rotation of said cam means and said pump, means for supplying hydraulic fluid to said pump, and means for applying a load to said pump, the applying of a load to said pump retarding rotation of said pump and thereby retarding rotation of said cam means with respect to the rotation of said auger, the retarding of rotation of said cam means bringing said cam means into cooperative abutment with said scroll, the cooperative abutment of said cam means and said scroll longitudinally moving said scroll with respect to said cam means for moving and retracting said auger into and out of the working face.

10. In a drill face for boring in a working face, the combination of a frame; a drill motor movably mounted on said frame; an auger rotatably supported by said drill motor, said auger having a substantially continuous scroll along the length thereof defining a spiral channel; and drill feeding means mounted upon said frame, said drill feeding means including auger feeding tube means rotatively mounted upon said frame and having an auger receiving opening therethrough, said auger extending through said auger receiving opening, a cam follower rotatably supported by said auger feeding tube means and extending into the auger receiving opening thereof in juxtaposition for operative engagement with said spiral scroll of said auger, the engagement of said cam follower and said scroll causing said auger feeding tube means to rotate at substantially the same speed as said auger, and brake means operatively interconnected to said auger feeding tube means for retarding rotation thereof, the retarding of rotation of said auger feeding tube means acting to bring said cam follower into operative rotating abutment with said scroll of said auger so that said cam follower rotatably follows the spiral channel defined by the scroll and longitudinally feeds the auger with respect to said auger feeding tube means for moving said auger into and out of the working face.

11. In a face drill for boring in a working face, the combination of a frame, said frame including a longitudinally extending track; an auger, said auger having a spiral scroll along the length thereof; a drill motor rotatably supporting said auger; a supporting base slidably supported upon said track, intermediate the ends thereof, for supporting said drill motor movably upon said track, said supporting base having a socketed portion slidably engaging said track and a cradle, said cradle extending transversely of said track and maintaining said supporting base in a slidably socketed position upon said track, said drill motor being fixedly secured to said cradle; cam means rotatably supported upon said frame and positioned for rotative cooperative abutment with said spiral scroll, said cam means normally rotating with said auger; and brake means mounted upon said frame and operatively connected to said cam means for retarding the rotation of said cam means, the retarding of rotation of said cam means bringing said cam means into cooperative abutment with said scroll, the cooperative abutment of said cam means and said scroll longitudinally moving said scroll with respect to said cam means and moving and retracting said auger into and out of the working face.

References Cited in the file of this patent

UNITED STATES PATENTS

| | | |
|---|---|---|
| 658,008 | Haley | Sept. 18, 1900 |
| 882,878 | Ford | Mar. 24, 1908 |
| 2,338,351 | Parrish | Jan. 4, 1944 |
| 2,788,194 | Hale | Apr. 9, 1957 |
| 2,807,441 | Sewell | Sept. 24, 1957 |
| 2,835,472 | Osborn | May 20, 1958 |

FOREIGN PATENTS

| | | |
|---|---|---|
| 472,362 | France | Aug. 1, 1914 |

UNITED STATES PATENT OFFICE
CERTIFICATE OF CORRECTION

Patent No. 3,028,922 April 10, 1962

Charles P. Hudnall, Jr.

It is hereby certified that error appears in the above numbered patent requiring correction and that the said Letters Patent should read as corrected below.

Column 2, line 54, for "varriage" read -- carriage --; column 9, line 3, for "in" read -- to --; column 10, line 27, for "drill face" read -- face drill --.

Signed and sealed this 24th day of July 1962.

(SEAL)
Attest:

ERNEST W. SWIDER
Attesting Officer

DAVID L. LADD
Commissioner of Patents